(12) United States Patent
Wen et al.

(10) Patent No.: US 11,501,135 B2
(45) Date of Patent: Nov. 15, 2022

(54) SMART ENGINE WITH DYNAMIC PROFILES

(71) Applicant: British Cayman Islands Intelligo Technology Inc., Hsinchu County (TW)

(72) Inventors: Meng-Hsun Wen, Hsinchu County (TW); Cheng-Chih Tsai, Kaohsiung (TW); Jen-Feng Li, Hsinchu (TW); Hong-Ching Chen, Hsinchu (TW); Chen-Chu Hsu, Taipei (TW); Tsung-Liang Chen, Taichung (TW)

(73) Assignee: BRITISH CAYMAN ISLANDS INTELLIGO TECHNOLOGY INC., Hsinchu County (TW)

(*) Notice: Subject to any disclaimer, the term of this patent is extended or adjusted under 35 U.S.C. 154(b) by 860 days.

(21) Appl. No.: 16/407,222

(22) Filed: May 9, 2019

(65) Prior Publication Data

US 2019/0370635 A1 Dec. 5, 2019

Related U.S. Application Data

(60) Provisional application No. 62/677,201, filed on May 29, 2018.

(51) Int. Cl.

| | |
|---|---|
| *G06N 3/04* | (2006.01) |
| *G06F 13/42* | (2006.01) |
| *G06T 5/00* | (2006.01) |
| *G06V 20/10* | (2022.01) |
| *G06V 10/82* | (2022.01) |
| *G06N 3/08* | (2006.01) |

(52) U.S. Cl.
CPC ....... *G06N 3/0454* (2013.01); *G06F 13/4282* (2013.01); *G06N 3/08* (2013.01); *G06T 5/003* (2013.01); *G06V 10/82* (2022.01); *G06V 20/10* (2022.01); *G06N 3/0445* (2013.01)

(58) Field of Classification Search
CPC ...... G06N 3/0445; G06N 3/0454; G06N 3/08; G06V 10/82; G06V 20/10; G06T 5/003; G06F 13/4282
See application file for complete search history.

(56) References Cited

U.S. PATENT DOCUMENTS

| | | | | |
|---|---|---|---|---|
| 6,062,475 | A * | 5/2000 | Feng | H04N 5/2254 348/E5.025 |
| 9,912,349 | B1 * | 3/2018 | Ouyang | G06F 17/16 |
| 2014/0279771 | A1 * | 9/2014 | Golovashkin | G06N 3/04 706/16 |
| 2014/0351183 | A1 * | 11/2014 | Germain | E21B 44/00 706/12 |

(Continued)

FOREIGN PATENT DOCUMENTS

CN 102103707 B 6/2014

*Primary Examiner* — Eric T Oberly
(74) *Attorney, Agent, or Firm* — Bacon & Thomas, PLLC (57) ABSTRACT

There is provided a smart engine including a profile collector and a main processing module. The profile collector is configured to store a plurality of profiles, one or more suitable profiles being dynamically selected according to an instruction from a user or an automatic selector. The main processing module is connected to the profile collector and directly or indirectly connected to a sensor, and configured to perform a detailed analysis to determine detailed properties of features, objects, or scenes based on suitable sensor data from the sensor.

18 Claims, 11 Drawing Sheets

(56) References Cited

U.S. PATENT DOCUMENTS

| | | | |
|---|---|---|---|
| 2019/0026555 A1* | 1/2019 | Cabral | G06V 20/35 |
| 2019/0065868 A1* | 2/2019 | Tran | G06K 9/629 |
| 2019/0213435 A1* | 7/2019 | Nikhara | G06T 7/50 |
| 2019/0385059 A1* | 12/2019 | Huang | G06K 9/6256 |
| 2021/0150812 A1* | 5/2021 | Su | G06T 9/002 |

\* cited by examiner

FIG. 12

SMART ENGINE WITH DYNAMIC PROFILES

CROSS REFERENCE TO RELATED APPLICATION

This application claims the benefit of filing date of U.S. Provisional Application Ser. No. 62/677,201, entitled "Proposed smart engine with dynamic profile" filed May 29, 2018 under 35 USC § 119(e)(1).

BACKGROUND OF THE INVENTION

1. Field of the Invention

The present invention relates to an artificial intelligence system. More specifically, the present invention relates to a smart engine with dynamic profiles for an edge device.

2. Description of Related Art

Generally, a deep neural network workflow includes two phases: a training phase and an inference phase. In the training phase, the deep neural network is trained to understand the natures of objects or the conditions of situations. In the inference phase, the deep neural network identifies (real-world) objects or situations for making an appropriate decision or prediction.

A deep neural network is typically trained on a computing server with multiple graphics processing unit (GPU) cards. The training takes a long period of time, ranging from hours to weeks, or even longer.

Figure 1:
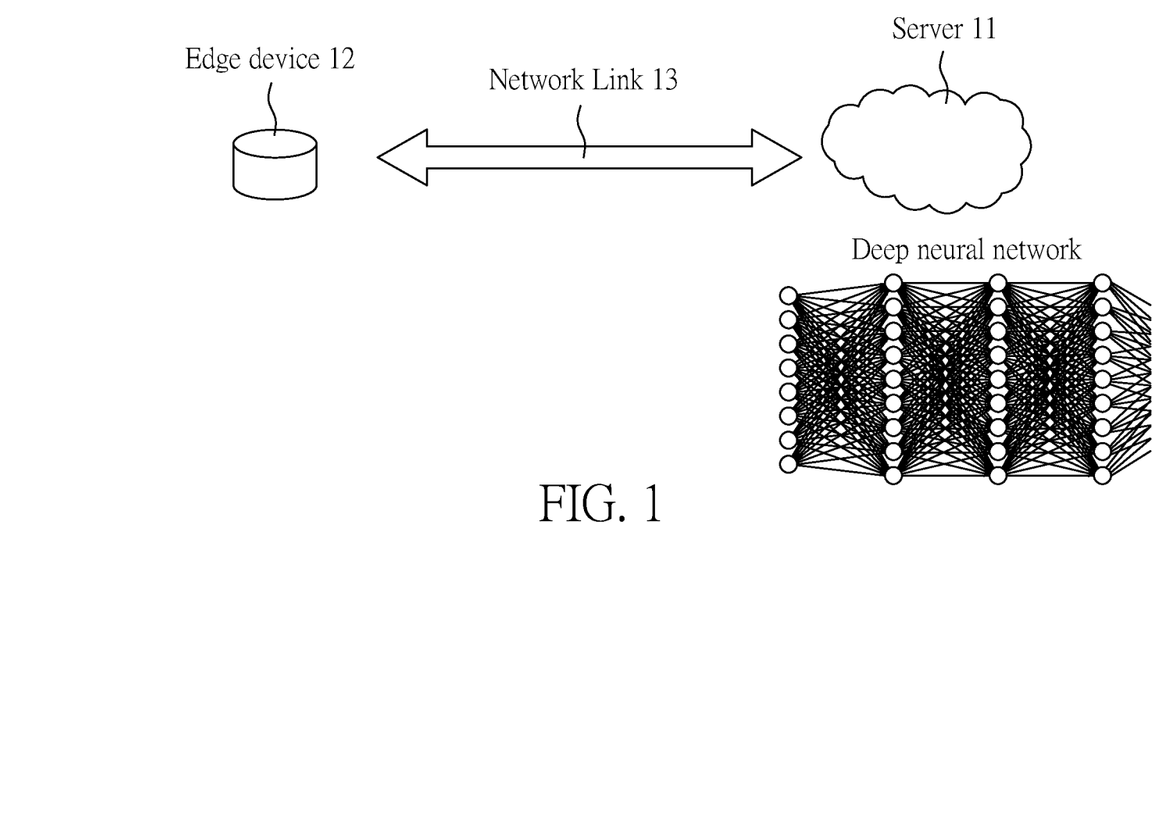
FIG. 1 shows a schematic diagram illustrating a prior art deep neural network architecture between a server and an edge device.

FIG. 1 shows a schematic diagram illustrating a prior art deep neural network architecture between a server 11 (for example, a standalone server or a cloud computing server) and an edge device 12. The server 11 includes a deep neural network, and the training is performed on the server 11.

The edge device 12 may be a smartphone, a wearable device, a home entertainment, a tablet, a computer, a smart-TV, a telephone, and so on. The edge device 12 has to download a trained model from the server 11 via a network link 13, and then the edge device 12 can perform the inference based on the trained model.

In such prior art, the edge device 12 is incapable of the training. Moreover, the deep neural network designed for the server 11 is not applicable to the edge device 12, because the edge device 12 only has limited computation capability. In other words, it is impractical to directly migrate the deep neural network from the server 11 to the edge device 12 without adaptive adjustment.

On the other hand, a conventional edge device is typically designed for a specific application. It does not dynamically adjust to different application scenarios. As a result, the conventional edge device can neither analyze different types of data sources, nor combine features, objects, or scenes extracted from different sources for further analysis, not to mention processing them at the same time.

These limitations of the edge device obstruct the development of machine learning realized in the edge device.

Therefore, it is desirable to provide an improved artificial intelligence system for edge device.

SUMMARY OF THE INVENTION

The present invention aims to provide a smart engine with dynamic profiles (hereinafter, smart engine), which is an artificial intelligence system.

One object of the present invention is to provide a smart engine that realizes analysis of various data sources (or inputs), such as voices, images, or other physical phenomena.

Another object of the present invention is to provide a smart engine that realizes combination of features, objects, or scenes extracted from various data sources, such as voice commands, objects in images, or other information derived from the physical phenomena, for further analysis.

Still another object of the present invention is to provide a smart engine having hybrid profiles for different applications. Each profile may include an analysis model, model parameters, network compression setting, and/or other settings. The analysis model may be a convolutional neural network (CNN), a recurrent neural network (RNN), or a long short-term memory (LSTM) network. Other neural networks such as YOLO, ResNet, Resnet-18, Resnet-34, Vgg16, GoogleNet, Lenet, or MobileNet, are also applicable.

Yet another object of the present invention is to provide a smart engine dynamic having a plurality of profiles switchable for different applications. A currently applied profile (hereinafter, current profile) may be switched from one to another according to a current condition, a previous smart engine state, a user command, and/or other instructions.

Accordingly, in one aspect of the present invention, there is provided a smart engine including a profile collector and a main processing module. The profile collector is configured to store a plurality of profiles. One or more suitable profiles are dynamically selected according to an instruction from a user or an automatic selector. The main processing module is connected to the profile collector and directly or indirectly connected to a sensor, and configured to perform a detailed analysis to determine detailed properties of features, objects, or scenes based on suitable sensor data from the sensor.

In another aspect of the present invention, there is provided a smart engine including a first buffer, an RGB-to-Y module, a second buffer, a basic neural network, a profile collector, a picker, and an expert neural network. The first buffer is configured to store raw images from an image sensor. The RGB-to-Y module is connected to the image sensor and/or the first buffer, and configured to process color images into gray images. The second buffer connected to the RGB-to-Y module, and configured to store the gray images. The basic neural network is connected to the RGB-to-Y module and the second buffer, and configured to perform a preliminary analysis to extract basic features, objects, or scenes from the gray images. The profile collector is connected to the basic neural network, and configured to store a plurality of profiles. The picker is connected to the first buffer, the second buffer, and the basic neural network, and configured to select one or more suitable images from the first buffer and/or the second buffer. The expert neural network is connected to the profile collector and the picker, and configured to perform a detailed analysis to determine detailed properties of features, objects, or scenes based on the suitable images.

In still another aspect of the present invention, there is provided a method of operating the smart engine communicating with an application/host processor and a plurality of sensors. The method includes following steps. Step S1 is using the application/host processor to set the smart engine. Step S2 is using the smart engine to set the sensors, the sensors being configured to generate sensor data. Step S3 is using the smart engine to extract features, objects, or scenes from the sensor data. Step S4 is using the smart engine to derive metadata after processing the extracted features, objects, or scenes.

Optionally, the profiles may be stored in the smart engine itself. Alternatively, the profiles may be stored in a flash memory, a SRAM, a DRAM, or a NVRAM on an application processor (AP), or other kinds of memory spaces. The profiles may also be generated dynamically rather than stored statically.

Optionally, the smart engine may utilize source data decomposition, filter decomposition, and/or model compression, for the purpose of low power and/or real time application.

Optionally, the smart engine may be used for object recognition, object tracking, face detection, facial expression recognition, gesture recognition, pose detection, character recognition, event detection, and so on.

Other objects, advantages, and novel features of the invention will become more apparent from the following detailed description when taken in conjunction with the accompanying drawings.

DETAILED DESCRIPTION OF THE EMBODIMENT

Different embodiments are provided in the following description. These embodiments are used to explain the technical contents of the present invention, but not meant to limit the scope of the claim inventions. One feature in one embodiment may be applied to other embodiments by suitable modification, substitution, combination, and/or separation according to this description.

It is noted that, in this description, ordinal numbers such as "first" or "second" are used to distinguish a plurality of elements having the same name, and it does not necessarily mean that an order, a level, an executing sequence, or a manufacturing sequence exists among them. Moreover, a "first" element and a "second" element may exist together in one component, or separately in different components.

Each component may be implemented as a single circuit or an integrated circuit in a suitable way, and it may include one or more active elements, such as transistors or logic gates, or one or more passive elements, such as resistors, capacitors, or inductors, and not limited thereto, except for specified conditions. The components may be connected to each other in a suitable way, for example, by matching inputs of one component to outputs of another component, forming series connection or parallel connection with one or more wires, or allowing inputting and/or outputting a plurality of signals in sequence or in parallel. The aforementioned configurations are designed depending on a practical application.

In the present invention, a system, an apparatus, a device, a module, or a unit may refer to one electronic component, or a digital circuit, an analog circuit, or a general circuit that is composed of a plurality of electronic components. An order or a level does not necessarily exist among them, except for specified conditions.

(General Smart Engine)

Figure 2:
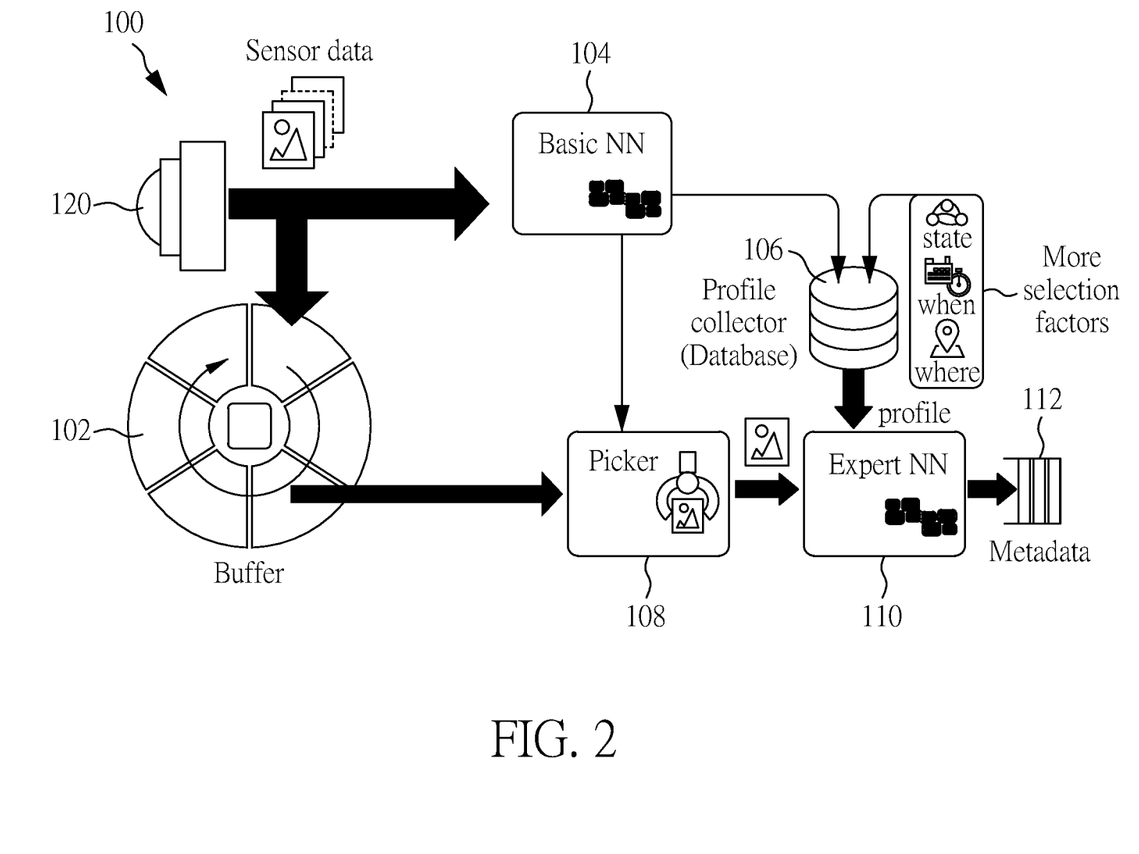
FIG. 2 shows a schematic block diagram of the smart engine according to one embodiment of the present invention.

FIG. 2 shows a schematic block diagram of the smart engine 100 according to one embodiment of the present invention.

The smart engine 100 includes a buffer 102, a preliminary processing module (e.g. a basic neural network, basic NN) 104, a profile collector 106, a picker 108, a main processing module (e.g. an expert neural network, expert NN) 110, and a meta-buffer 112.

The preliminary processing module 104 or the picker 108 may be regarded as an automatic selector.

In other embodiments, the preliminary processing module 104 or the picker 108 may be ignored, and an instruction may be given manually by a user rather than generated by the preliminary processing module 104 or the picker 108.

In still other embodiments, the buffer 102 or the meta-buffer 112 may be ignored, so that data may be sent from a sensor directly to the preliminary processing module 104 or sent from the preliminary processing module 104 directly to an application/host processor.

For the convenience of understanding, in the following description, the preliminary processing module 104 is set to be a basic neural network (NN) 104, and the main processing module 110 is set to be an expert neural network (NN) 110. However, the processing modules may employ possible algorithms other than neural networks.

It is to be understood that the smart engine 100 may be regarded as a system, a processor, or a controller. The buffer 102, the basic NN 104, the profile collector 106, the picker 108, the expert NN 110, and the meta-buffer 112 may be regarded as modules. They may be implemented as hardware or software, and may be implemented as separated circuit devices on a set of chips or an integrated circuit device on a single chip.

The buffer 102 is connected to a sensor 120. It is noted that the sensor 120 may be or may not be a part of the smart engine 100, which means the sensor 120 may be an individual device out of the smart engine 100.

The sensor 120 is configured to detect physical phenomena, such as sound or light, and accordingly generate sensor data, such as voice data or image data. Of course, the sensor 120 may generate the sensor data according to raw data received from the Internet or other databases, and in this case, the sensor 120 may be regarded generally as a receiver.

The sensor data are then stored into the buffer 102.

The basic NN 104 is used to perform a preliminary analysis before a detailed analysis performed by the expert NN 110.

In one embodiment, the basic NN 104 is designed (or configured) to have a general function in comparison with the expert NN 110. In another embodiment, the basic NN 104 is designed (or configured) to have a simpler structure in comparison with the expert NN 110.

For example, the basic NN 104 may recognize a rough appearance of a text in any language, while, the expert NN 110 may recognize a Chinese word (or character).

The basic NN 104 and the expert NN 110 may be trained in different mechanism, or trained with different training data, so as to have different configurations.

The basic NN 104 is connected to the sensor 120, the buffer 102, or both of them, at its input end, to receive the sensor data. The basic NN 104 is connected to the picker 108 and the profile collector 106 at its output end. The basic NN 104 performs the preliminary analysis to determine rough features, objects, or scenes, based on the sensor data, and accordingly selects one or more suitable profiles from the profile collector 106 to apply to the expert NN 110. The basic NN 104 also enables the picker 108 to select one or more suitable sensor data from the buffer 102 and send the suitable sensor data to the expert NN 110.

For example, when the basic NN 104 roughly recognizes an appearance of a Chinese word, the basic NN 104 may select a profile for Chinese word detection to apply to the expert NN 110. Next time, when the basic NN 104 roughly recognizes an appearance of an English word, the basic NN 104 may change the currently applied profile for Chinese word detection to a profile for English word detection.

The profile collector 106 is connected between the basic NN 104 and the expert NN 110. The profile collector 106 stores a plurality of profiles corresponding to different categories, respectively. As will be discussed later, in the present invention, the profile is used to define a neural network. Each profile may include an analysis model, model parameters, network compression settings, and/or other settings.

The picker 108 is connected to the buffer 102 and the basic NN 104 at its input end, and connected to the expert NN 110 at its output end. The picker 108 may be configured to simply select one or more suitable sensor data from the buffer 102, and send the suitable sensor data to the expert NN 110, according to an instruction (possibly derived after the preliminary analysis) from the basic NN 104 and/or the picker's own decision. Optionally, the picker 108 may be combined with a transformer (not shown) or a filter (not shown) for data processing to assist the detailed analysis of the expert NN 110.

For example, the picker 108 may select one or more clearest images so that the expert NN 110 can analyze them in a more efficient way.

The expert NN 110 is connected to the profile collector 106 and the picker 108 at its input end, and connected to the meta-buffer 112 at its output end. The expert NN 110 performs the detailed analysis to precisely determine detailed properties of the features, objects, or scenes, based on the suitable sensor data.

For example, the expert NN 110 may determine the exact Chinese word or even the font of the Chinese word shown in the images.

The expert NN 110 sends results to the meta-buffer 112. The results stored in the meta-buffer 112 may be further read by an external device, such as an application processor or a host processor, which exists out of the smart engine 100.

In other embodiments, the meta-buffer 112 may be omitted, and the expert NN 110 may send the results directly to an external device.

A meta-buffer is used to store metadata, such as the data analysis results. The metadata summarizes information about data, and makes it easier to find and work with particular instances of data. The metadata is typically in text form, for example, it may be compressed data, or codes, for example, a code "789" may represent "dog".

According to the present invention, it is not necessary to load a complete neural network in the smart engine 100. Instead, the analysis is divided into the preliminary analysis of the basic NN 104 and the detailed analysis of the expert NN 110. The basic NN 104 is simplified because it is designed to handle only the analysis of rough features, objects, or scenes. The expert NN 110 is also simplified because it is designed to handle the analysis of a category of features, objects, or scenes.

This is achieved by defining different profiles corresponding to different categories, and changing the currently applied profile of the expert NN 110 according to the preliminary analysis of the basic NN 104.

(Profile)

Figure 3:
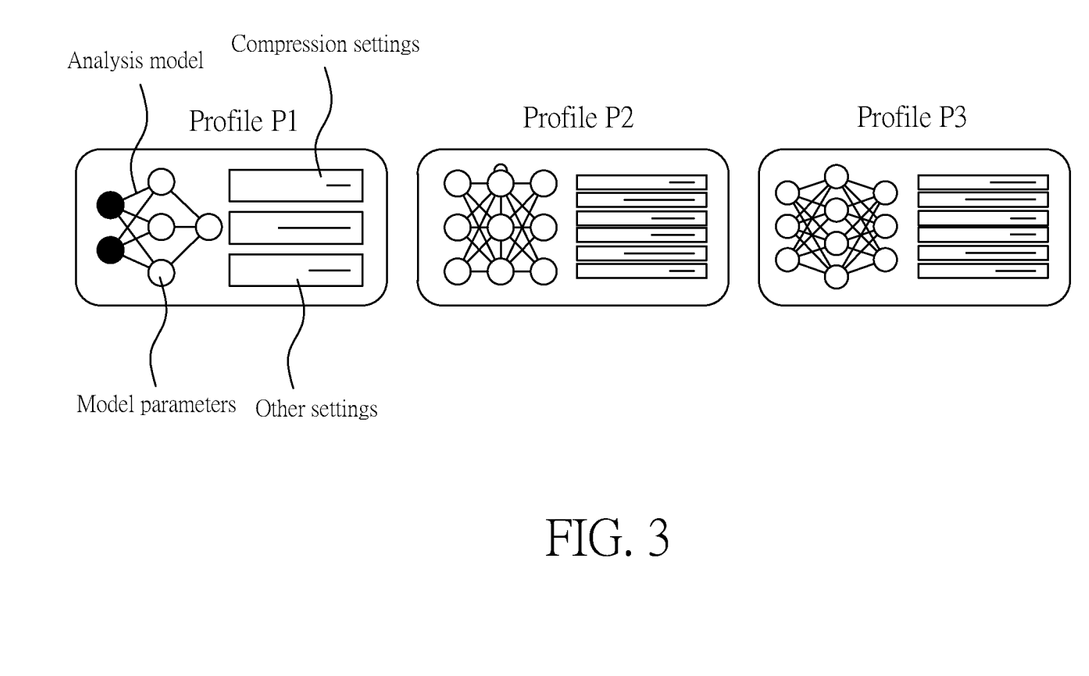
FIG. 3 shows a schematic diagram illustrating a plurality of profiles according to one embodiment of the present invention.

FIG. 3 shows a schematic diagram illustrating a plurality of profiles, P1, P2, and P3, for example, according to one embodiment of the present invention.

Generally, a profile is a set of configuration information that defines a system environment. In the present invention, the profile is used to define a neural network.

Each profile may include an analysis model, model parameters, compression settings, and/or other settings.

The analysis model may be defined by a neural network (NN) configuration. The analysis model may be a convolutional neural network (CNN), a recurrent neural network (RNN), or a long short-term memory (LSTM) network. Other neural networks such as YOLO, ResNet, Resnet-18, Resnet-34, Vgg16, GoogleNet, Lenet, or MobileNet, are also applicable.

A profile may correspond to a category, for example, food, cookie, drink, clothe, traffic, pet, family, emotion, place, activity, or hobby, and not limited thereto. The term "category" may refer to "scenario" or other equivalent terms in the present invention.

As shown in FIG. 3, the profiles P1, P2, and P3 have different neural networks, and they have different structures consisting of different numbers of neurons and different numbers of links.

Each neuron of the analysis model stores the model parameters. The model parameters may include a weight, a bias, or other parameters used in the neural network.

The compression settings are used to modify the structure of the analysis model or the values of the model parameters. A network compression may be pruning, quantization, and/or architectural modification.

As one advantage of the present invention, the profiles of the smart engine are switchable for different applications.

Possible switching modes include but are not limited to:

(a) Static mode: a designated profile is always used in a specific application. The static mode may be enabled by a user command.

(b) Dynamic mode: the current profile is switched from a general profile to a specific profile when the smart engine detects specific features, objects, or scenes, with the current profile. For example, the current profile may be switched from the general profile for text detection to the specific profile for Chinese word detection when the smart engine roughly recognizes an appearance of a Chinese word.

(c) Adaptive mode: the current profile is switched to a related profile when the smart engine detects specific features, objects, or scenes, with current profile. For example, the current profile may be switched from the profile for baby voice detection to the profile for baby facial expression recognition.

(d) Time sharing mode: various profiles are interleaved over time. For example, the current profile may be switched periodically between a voice profile and an image profile.

In one embodiment, a profile hierarchy, or generally, a profile relationship may be defined among the profiles.

Figure 4:
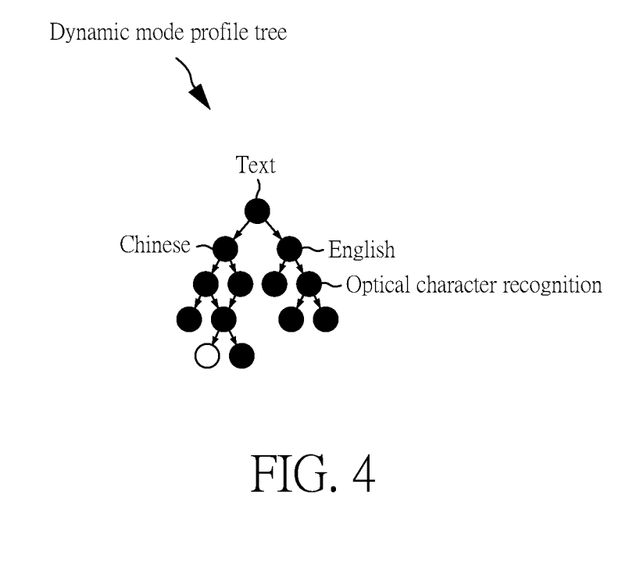
FIG. 4 shows an example of a profile hierarchy.

FIG. 4 shows an example of a profile hierarchy (or profile tree), wherein a general (or superior) profile for text detection has two specific (or subordinate) profiles for Chinese detection and an English detection, respectively. The profile for English detection has a more specific (or subordinate) profile for optical character recognition.

The profile hierarchy of FIG. 4 realizes a dynamic mode of profile switching, wherein the current profile may be switched from the general profile for text detection to the specific profile for Chinese word detection when an appearance of a Chinese word is roughly recognized.

Figure 5:
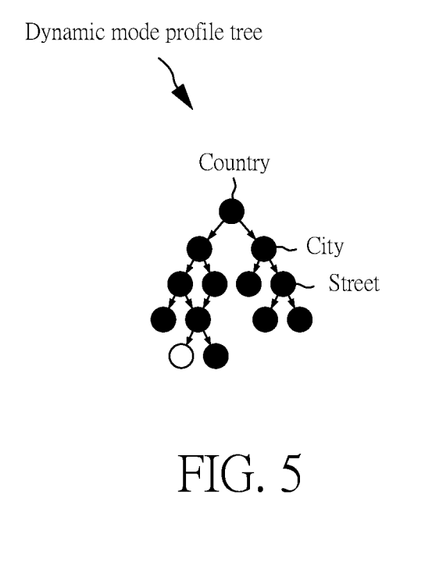
FIG. 5 shows another example of a profile hierarchy.

FIG. 5 shows another example of a profile hierarchy (or profile tree), wherein a general (or superior) profile for country information has a specific (or subordinate) profile for city information. The profile for country information has a more specific (or subordinate) profile for street information.

The profile hierarchy of FIG. 5 also realizes a dynamic mode of profile switching, wherein the current profile may be switched from the general profile for country information to the specific profile for city information when a landscape of a city is roughly recognized.

Figure 6:
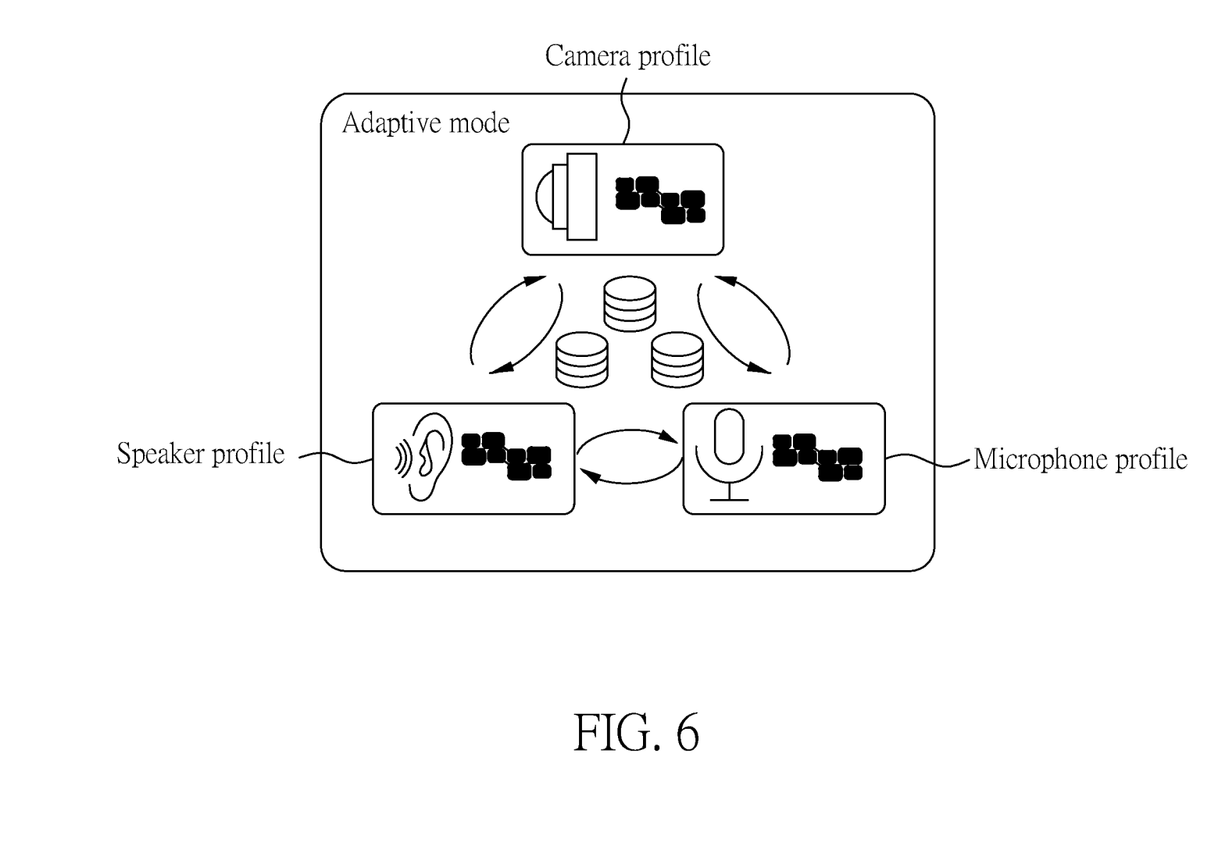
FIG. 6 shows an example of a profile relationship.

FIG. 6 shows an example of a profile relationship among a camera profile, a microphone profile, and a speaker profile.

The profile relationship of FIG. 6 realizes an adaptive mode of profile switching, wherein the current profile is switched from the microphone profile to a camera profile to enable a quick response (QR) code detection when a voice command "pay money" is heard (for example, by a microphone).

In another embodiment, a profile may be fully or partially updated.

Figure 7:
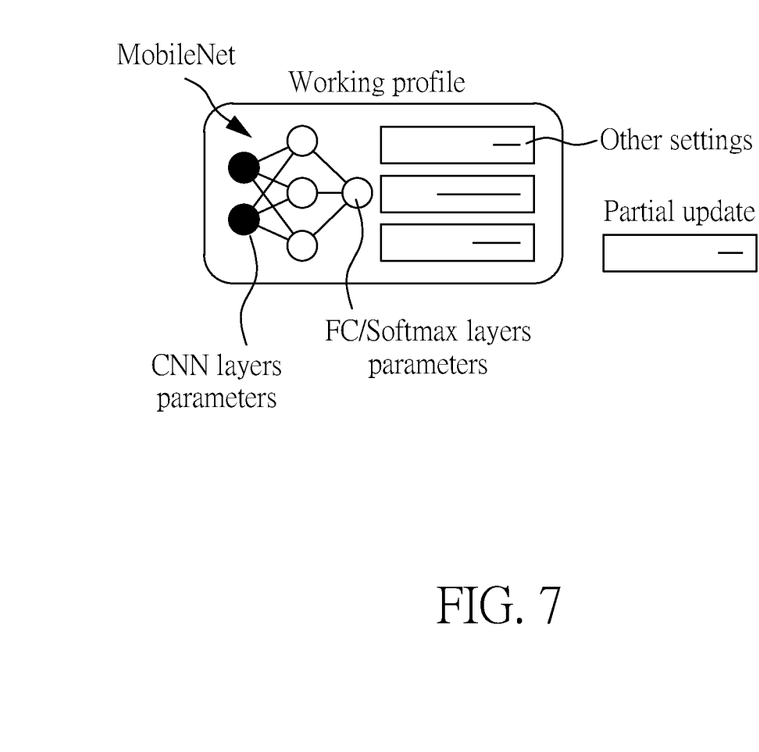
FIG. 7 shows an example of a partially updated profile.

FIG. 7 shows an example of a partially updated profile. The profile employs a MobileNet neural network as its analysis model. The profile has CNN layers parameters and fully connected (FC) layer and/or Softmax layers parameters as its model parameters. The profile may be partially updated with FC and/or Softmax layers parameters.

(Smart Engine for Image Processing)

Figure 8:
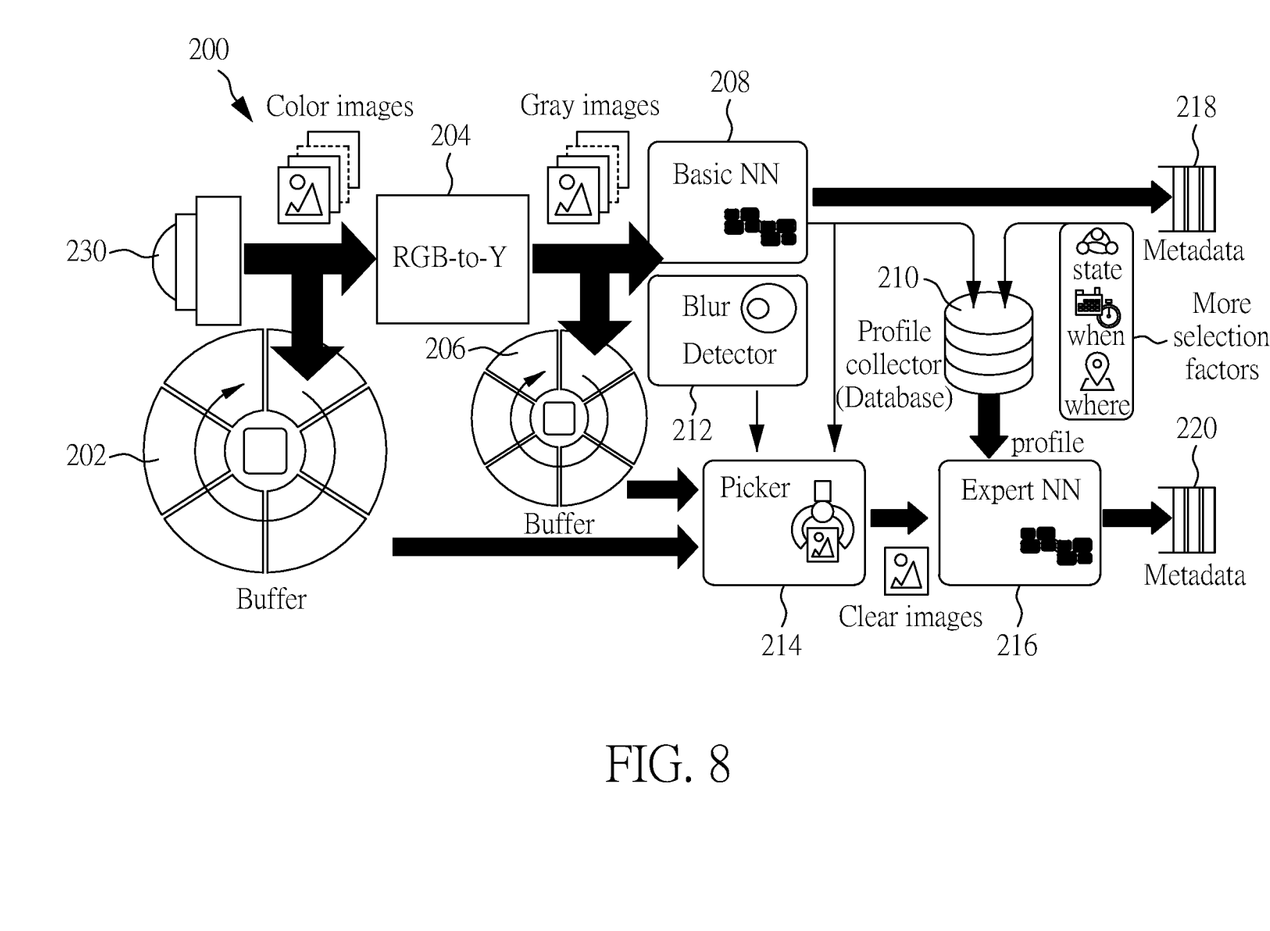
FIG. 8 shows a schematic block diagram of the smart engine for image processing according to one embodiment of the present invention.

FIG. 8 shows a schematic block diagram of the smart engine 200 for image processing according to one embodiment of the present invention.

The embodiment of FIG. 8 is a variant with more modules added to the embodiment of FIG. 2.

As shown in FIG. 8, the smart engine 200 includes a first buffer 202, a RGB-to-Y module 204, a second buffer 206, a basic NN 208, a profile collector 210, a blur detector 212, a picker 214, an expert NN 216, a first meta-buffer 218, and a second meta-buffer 220.

An image sensor 230 is connected to the first buffer 202 and the RGB-to-Y module 204. The image sensor 230 generates a plurality of raw images, for example, from the physical world or the internet. Similarly, the image sensor 230 may be or may not be a part of the smart engine 200, which means the image sensor 230 may be an individual device out of the smart engine 200.

The RGB-to-Y module 204 is connected to the image sensor 230 and/or the first buffer 202 at its input end, and connected to the second buffer 206, the basic NN 208, and the blur detector 212 at its output end.

The smart engine 200 is configured to store all of the raw images in a first buffer 202. Gray images may be stored directly into the second buffer 206, while, (RGB) color images may be stored into the second buffer 206 after being processed by the RGB-to-Y module 204 to become gray images.

Herein, R, G, B, and Y refer respectively to the values of red, green, blue, and luminance of the image.

The basic NN 208 is connected to the RGB-to-Y module 204 and the second buffer 206 at its input end, and connected to the picker 214, the profile collector 210, and the first meta-buffer 218 at its output end.

The smart engine 200 is configured to perform a preliminary analysis to extract basic features, objects, or scenes from the gray images stored in the second buffer 206 based on the basic NN 208. The basic NN 208 is configured to provide preliminary results such as a region of interest (ROI), positions of features, objects, or scenes, for the expert NN 216 to perform a detailed analysis. The preliminary results derived by the basic NN 208 are sent to the first meta-buffer 218, and may be further read by an external device, such as an application processor or a host processor, which exists out of the smart engine 200.

The smart engine 200 is configured to select one or more suitable profiles to apply to the expert NN 216 depending on the preliminary results provided by the preliminary analysis of the basic NN 208, a current state and/or a previous state of the (basic and/or expert) neural networks, time information, and/or location information (labeled as "more selection factors" in FIG. 8).

The smart engine 200 is also configured to select one or more suitable images (hereinafter, the remaining clear images after blur detection) by the picker 214 for the expert NN 216 to perform the detailed analysis. The selections may depend on the preliminary results provided by the preliminary analysis of the basic NN 208, a determination of the blur detector 212, a current state and/or a previous state of the (basic and/or expert) neural networks, time information, and/or location information.

The profile collector 210 is connected between the basic NN 208 and the expert NN 216, and stores a plurality of profiles corresponding to different categories. In this embodiment, the profiles are stored in the smart engine 200 itself. However, in other embodiments, the profiles may be stored in a flash memory, a SRAM, a DRAM, or a NVRAM on the application processor, or other kinds of memory spaces. Alternatively, the profiles may be accessed from a storage out of the smart engine 200 via any interface, such as SPI, I2C, I3C, and/or SLIMbus.

The time information (labeled as "when" in FIG. 8) is used to indicate the time associated with the features, objects, or scenes, and it may refer to a weekend or a workday, a day or a night, a meeting time, a tea time, a lunch time, a dinner time, an event marked in a calendar, and so on. The time information may come from the application processor, the host processor, or other ways.

The location information (labeled as "where" in FIG. 8) is used to indicate the location associated with the features, objects, or scenes, and it may refer to home, a car, an office, a restaurant, an amusement park, a hospital, a supermarket, a city, a country, an airport, a subway, and so on. The location information may come from the application processor, the host processor, or other ways.

The selection of the profiles and/or the selection of the images may depend on the current state and/or the previous state of the neural network. For example, when a rough appearance of Chinese word is recognized, the smart engine 200 may switch the current state of a general profile for text detection to the next state of a specific profile for Chinese word detection. For another example, after the smart engine 200 has recognized an exact Chinese word in the previous state, the smart engine 200 may refer to the recognition result for further analysis of the font of the Chinese word in the current state.

The blur detector 212 is connected between the second buffer 206 and the picker 214. The blur detector 212 is used to detect blurred images, and help the picker 214 to filter out the blurred images, and send the remaining clear images to the expert NN 216, so that the expert NN 216 can analyze the images in a more efficient way. Herein, the remaining clear images may be the original gray images from the second buffer 206 or the original color images from the first buffer 202. It is also possible to introduce an image processing module (not shown) to perform image processing before the images are sent to the expert NN 216.

The expert NN 216 is connected to the picker 214 and the profile collector 210 at its input end, and connected to the second meta-buffer 220 at its output end. The expert NN 216 receives the remaining clear images from the picker 214, and performs the detailed analysis to precisely determine detailed properties of the features, objects, or scenes from the images.

The expert NN 216 sends results to the second meta-buffer 220. The results stored in the second meta-buffer 220 may be further read by an external device, such as an application processor or a host processor, which exists out of the smart engine 200 via any interface, such as SPI, I2C, I3C, and/or SLIMbus.

However, in other embodiments, the RGB-to-Y module 204 or the blur detector 212 may be replaced by other modules, for example, for voice processing. The first meta-buffer 218 or the second meta-buffer 220 may also be omitted, and the expert NN 216 may send the results directly to an external device.

(Data Access)

Figure 9:
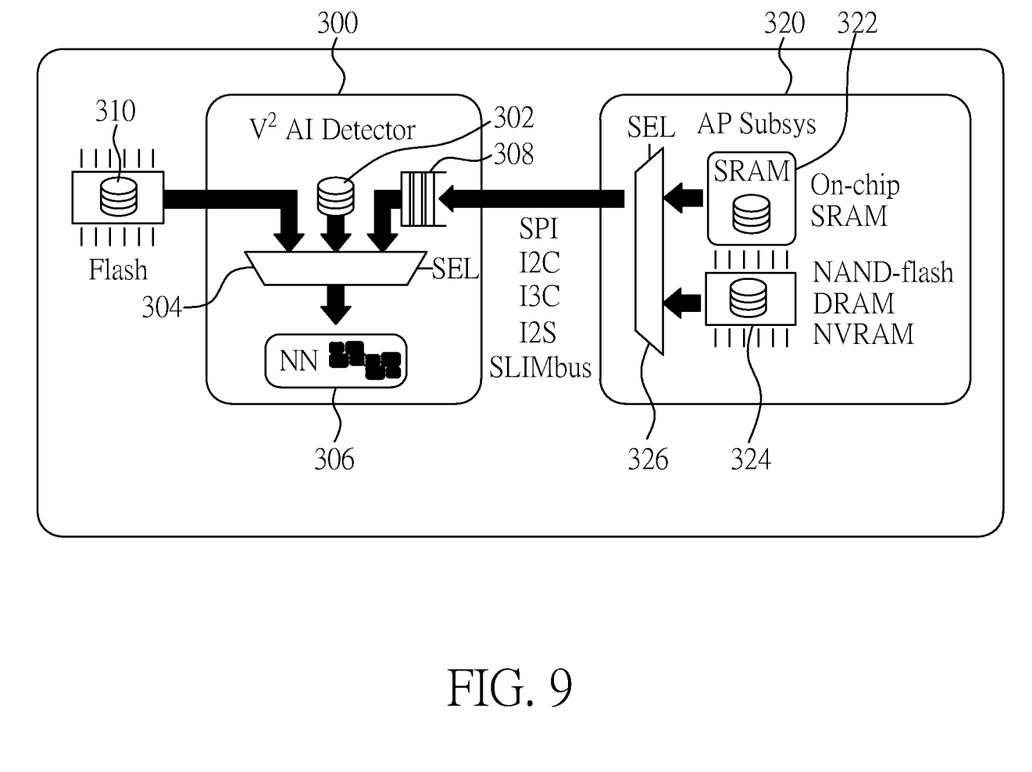
FIG. 9 shows a schematic block diagram of data access of the smart engine according to one embodiment of the present invention.

FIG. 9 shows a schematic block diagram of data access of the smart engine 300 according to one embodiment of the present invention.

The smart engine 300 is labeled as "V$^2$ AI detector". The smart engine 300 may be the smart engine 100 of FIG. 2, the smart engine of FIG. 8, or their possible variants.

The smart engine 300 includes a first SRAM 302, a first multiplexer 304, and a neural network (NN) 306. The multiplexer 304 is connected between the first SRAM 302 and the NN 306, and configured to select one or more profiles stored in the first SRAM 302 to apply to the NN 306. A local profile database is therefore constructed in the smart engine 300.

Optionally, the smart engine 300 may further include a meta-buffer 308 receiving external data, and connected to the first multiplexer 304.

Optionally, the first multiplexer 304 may further be connected to a flash memory 310 storing more profiles. The flash memory 310 may not be in the smart engine 300.

An application processor subsystem 320 is labeled as "AP Subsys". The application processor subsystem 320 is not a part of the smart engine 300.

The application processor subsystem 320 includes a second SRAM 322, a memory space 324, and a second multiplexer 326. The second SRAM 322 and the memory space 324 are connected to the second multiplexer 326, and the second multiplexer 326 is communicated to the meta-buffer 308 of the smart engine 300, for example, via SPI, I2C, I3C, and/or SLIMbus. The second SRAM 322 may be an on-chip SRAM, and not limited thereto. The memory space may be a NAND-flash, a DRAM, or a NVRAM, and not limited thereto. The second multiplexer 326 is configured to select one or more profiles stored in the second SRAM 322 or the memory space 324 to send to the meta-buffer 308 of the smart engine 300. An external profile database is therefore constructed in the application processor subsystem 320.

(Operation Sequence)

Figure 10:
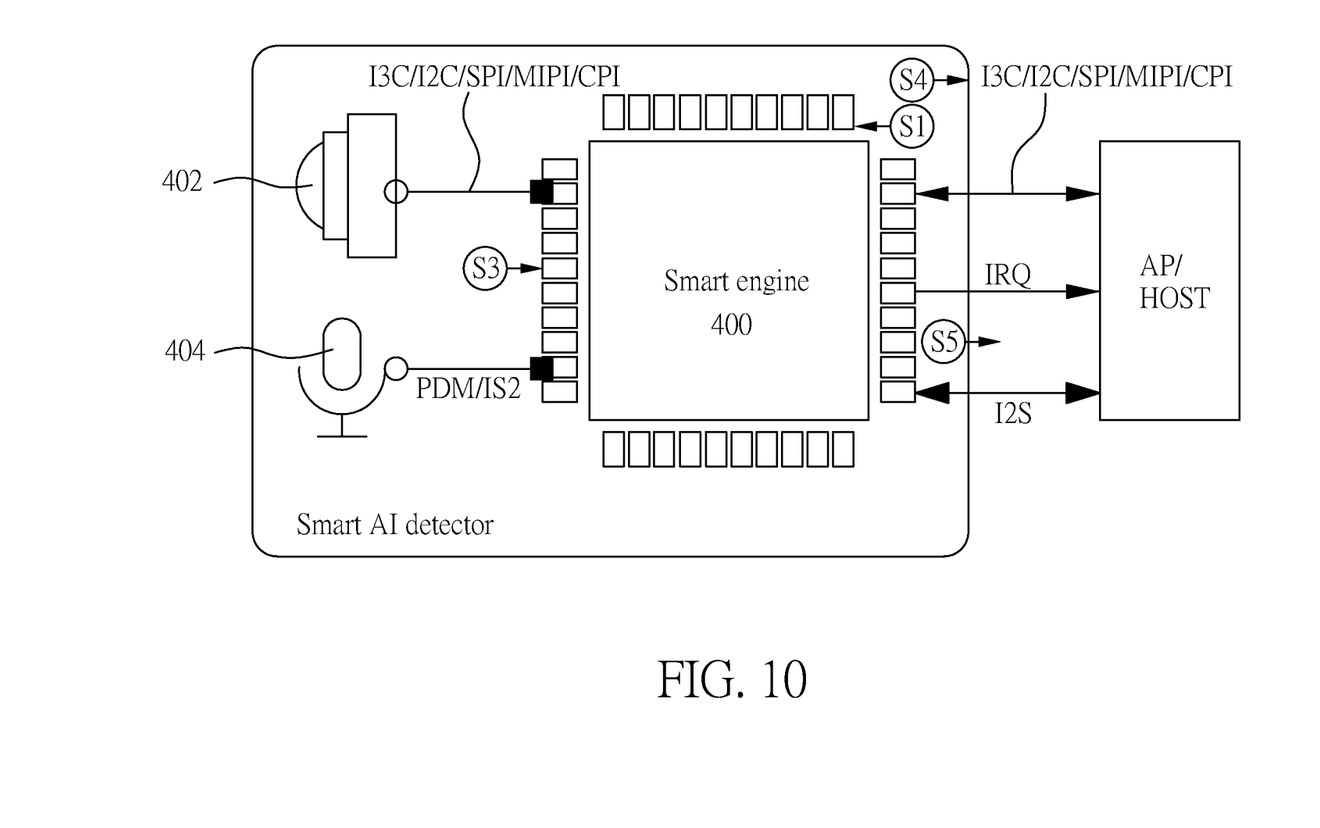
FIG. 10 shows a schematic block diagram of the smart engine communicating with sensors and an application/host processor according to one embodiment of the present invention.

FIG. 10 shows a schematic block diagram of the smart engine 400 communicating with sensors 402 and 404, and an application/host processor 406 according to one embodiment of the present invention. In FIG. 10, reference numerals in circles indicate an operation sequence of the smart engine 400 of the present invention.

Figure 11:
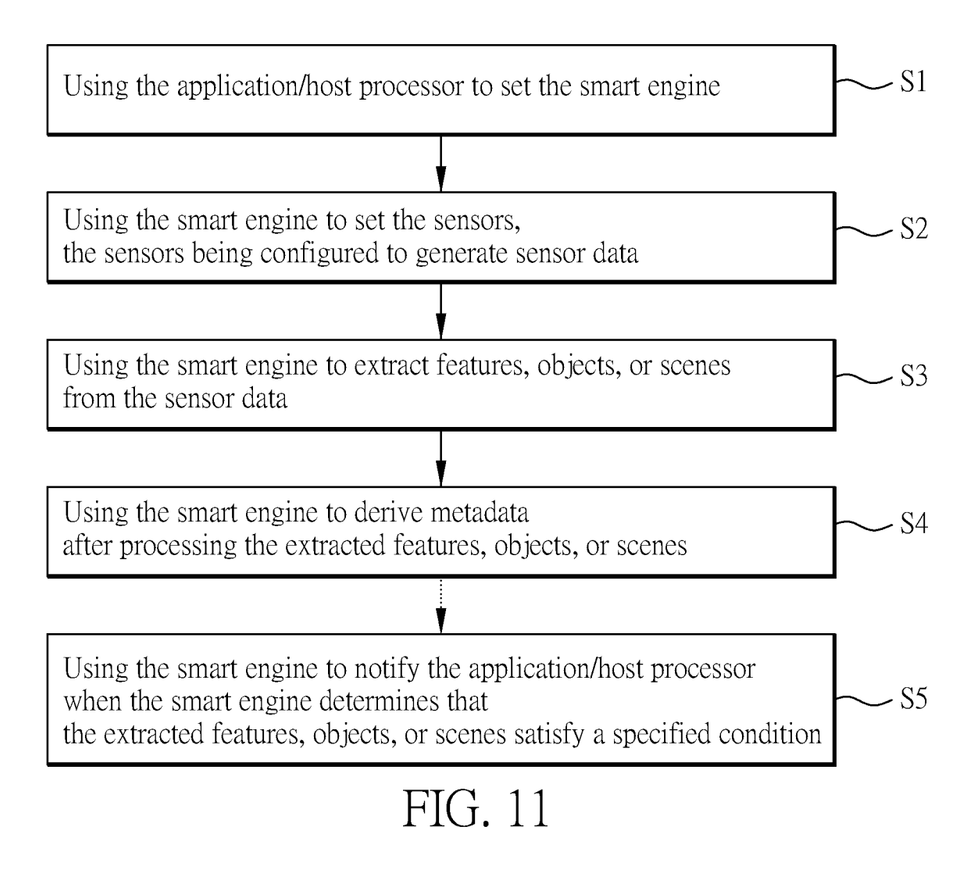
FIG. 11 shows a flowchart of the method of operating the smart engine 400 according to one embodiment of the present invention.

FIG. 11 shows a flowchart of the method of operating the smart engine 400 according to one embodiment of the present invention.

The smart engine 400 may have the configurations or the functions discussed in the aforementioned embodiments of FIGS. 2, 8, and 9, and their possible variants.

In this embodiment, the smart engine 400 is implemented as an integrated circuit device on a single chip. After the chip is setup, for example, in an edge device, it requires a process to build up a communication among the smart engine 400, the sensors 402 and 404, and the application/host processor 406. After the setup is complete, the smart engine 400 can start to work.

Referring both to FIGS. 10 and 11, the method of operating the smart engine 400 of the present invention includes the following steps:

Step S1 is using the application/host processor 406 to set the smart engine 400. The settings may be done via buses I3C, I2C, SPI, MIPI, I2S, and/or CPI. It is also possible to use serial buses, parallel buses, or other kinds of buses depending on practical applications.

Step S2 is using the smart engine 400 to set the sensors 402 and 404. The settings may be done via buses I3C, I2C, SPI, MIPI, I2S, and/or CPI. The sensors 402 and 404 may include a voice sensor or an image sensor. The sensors 402 and 404 generate sensor data, for example, from the physical world or the internet.

Step S3 is using the smart engine 400 to extract features, objects, or scenes from the sensor data. The sensor data may be voice data, image data, or other types of data.

Step S4 is using the smart engine 400 to derive metadata after processing the extracted features, objects, or scenes. The metadata may be sent via buses I3C, I2C, SPI, MIPI, I2S, and/or CPI.

In one embodiment, there may be an additional step S5. The step S5 is using the smart engine 400 to notify the application/host processor 406 when the smart engine 400 determines that the extracted features, objects, or scenes satisfy a specified condition. The notification may be an interrupt request (IRQ) sent via an interrupt pin.

(Applications)

One application of the smart engine of the present invention is to analyze voice contents by using a general profile for detecting basic voice commands, keywords, animal sounds, music, human conversations, car sounds, aircraft sounds, or other basic voice features, and then, using a more specific profile to determine more specific voice patterns, such as a dog bark, when the detection of the basic voice commands, keywords, or other basic voice features reaches specified conditions.

Further, the smart engine may extract interesting parts from source voices, and output the interesting parts directly to an application processor or a host processor, or it may continue to carry out a detailed analysis based on the interesting parts. Moreover, the smart engine may apply noise reduction to the source voices, and output the noise-reduced voices directly to the application processor or the host processor, or it may continue to carry out the detailed analysis voice contents based on the noise-reduced voices.

Another application of the smart engine of the present invention is to analyze image contents by using a general profile for detecting basic objects, object shapes, object sizes, or other basic features, and then, using a more specific profile to determine more specific image patterns, such as a QR code, an animal, a logo, a face, and so on, when the detection of the basic objects, object shapes, object sizes, or other basic features reaches specified conditions.

Figure 12:
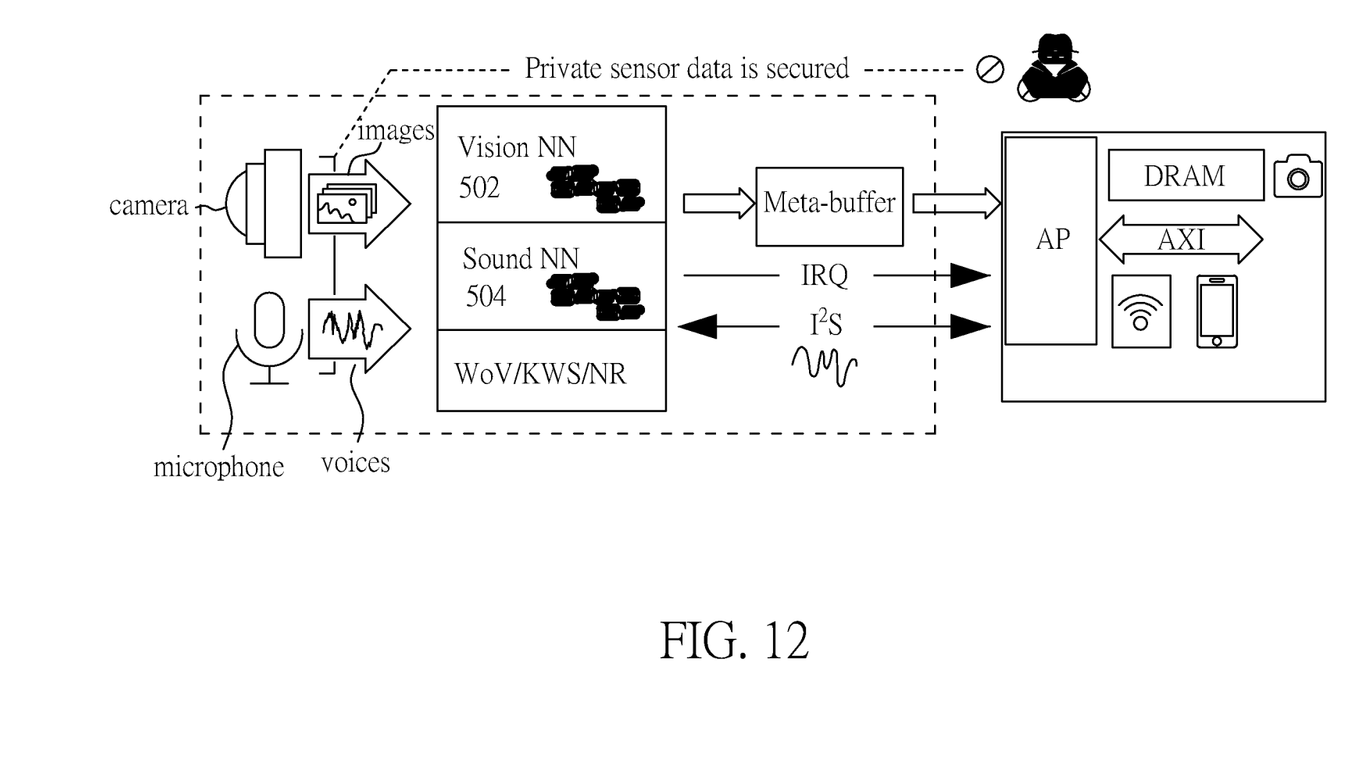
FIG. 12 shows a schematic block diagram illustrating a hybrid application of the smart engine of the present invention.

FIG. 12 shows a schematic block diagram illustrating a hybrid application of the smart engine 500 of the present invention.

The smart engine 500 is used to analyze both of voices and images with hybrid profiles of voices and images. The profiles may be switched among each other based on a time sharing (or time interleaving) mechanism.

For example, the current profile may be an image profile constructing a vision neural network (NN) 502, and when an animal appearance is detected, the next profile will be a voice profile constructing a sound neural network (NN) 504 for detecting animal sounds.

For another example, the current profile may be a voice profile constructing a sound NN 504, and when a voice command "pay money" is heard, the next profile will be an image profile constructing a vision NN 502 for detecting QR code.

(Effect)

The smart engine can be always-on by virtue of its low power consumption.

As illustrated in FIG. 12, the sensor data, such as raw voices or raw images, are secured because they are processed by the smart engine before the application software accesses them. The use privacy is guaranteed. It avoids illegal tracking in case the application software is hacked.

The smart engine can handle hybrid sensor data including at least the voices and the images.

The smart engine can analyze and extract features, objects, or scenes from the hybrid sensor data.

The smart engine can minimize requirements of network upstream data bandwidth (B/W) and/or AP loading.

It is possible to implement an interrupt of intelligent sensory events, such as wake on voice (WoV), keyword spotting (KWS), QR code detection, logo detection, and so on.

According to simulation results, in image processing, the smart engine of the present invention can extract one thousand (1K) features, objects, or scenes from a QQVGA (160×120) in a frame rate of 5 fps (frames per second) based on a MobileNet neural network.

In voice processing, the smart engine of the present invention can identify one audio scene from ten classes in every four seconds.

The simulation results are provided to verify the function and the performance of the smart engine of the present invention, but not meant to limit the scope of the claim inventions.

Although the present invention has been explained in relation to its preferred embodiment, it is to be understood that many other possible modifications and variations can be made without departing from the spirit and scope of the invention as hereinafter claimed.

What is claimed is:

1. A smart engine comprising:
a buffer configured to store sensor data from a sensor;
a preliminary processing module connected to the sensor and/or the buffer, the preliminary processing module being configured to perform a preliminary analysis based on the sensor data, the preliminary processing module being an automatic selector;
a profile collector connected to the preliminary processing module, the profile collector being configured to store a plurality of profiles, one or more suitable profiles being dynamically selected according to an instruction from a user or the automatic selector;
a picker connected to the buffer and the preliminary processing module, the picker being configured to select one or more suitable sensor data from the buffer; and
a main processing module connected to the profile collector and the picker, the main processing module being configured to receive the suitable sensor data from the picker and perform a detailed analysis to determine detailed properties of features, objects, or scenes based on sensor data from the sensor.

2. The smart engine of claim 1, wherein the preliminary processing module is a basic neural network, and the main processing module is an expert neural network.

3. The smart engine of claim 2, wherein the preliminary processing module is configured to have a general function or a simpler structure in comparison with the main processing module.

4. The smart engine of claim 2, wherein the preliminary processing module is configured to select the one or more suitable profiles from the profile collector to apply to the main processing module.

5. The smart engine of claim 1, wherein the profiles correspond to different categories, respectively.

6. The smart engine of claim 1, wherein each of the profiles includes an analysis model, model parameters, and compression settings, which define the main processing module.

7. The smart engine of claim 1, wherein the picker is configured to select according to another instruction from the preliminary processing module and/or the picker's own decision.

8. The smart engine of claim 1, wherein the profile collector includes a multiplexer configured to select the profiles.

9. The smart engine of claim 8, wherein the multiplexer is configured to select the profiles from an internal SRAM of the smart engine, an external flash, or an additional meta-buffer, the additional meta-buffer communicating with an application processor subsystem.

10. A smart engine comprising:
a first buffer configured to store raw images from an image sensor;
an RGB-to-Y module connected to the image sensor and/or the first buffer, the RGB-to-Y module being configured to process color images into gray images;

a second buffer connected to the RGB-to-Y module, the second buffer being configured to store the gray images;

a basic neural network connected to the RGB-to-Y module and the second buffer, the basic neural network being configured to perform a preliminary analysis to extract basic features, objects, or scenes from the gray images;

a profile collector connected to the basic neural network, the profile collector being configured to store a plurality of profiles;

a picker connected to the first buffer, the second buffer, and the basic neural network, the picker being configured to select one or more suitable images from the first buffer and/or the second buffer; and an expert neural network connected to the profile collector and the picker, the expert neural network being configured to perform a detailed analysis to determine detailed properties of features, objects, or scenes based on the suitable images.

11. The smart engine of claim 10, further comprising a first meta-buffer connected to the basic neural network, and/or a second meta-buffer connected to the expert neural network.

12. The smart engine of claim 11, wherein the first meta-buffer and/or the second meta-buffer is read via an interface of SPI, I2C, I3C, and/or SLIMbus.

13. The smart engine of claim 10, further comprising a blur detector connected between the second buffer and the picker, the blur detector being configured to detect blurred images, and help the picker to filter out the blurred images and remain clear images.

14. The smart engine of claim 10, wherein the profiles are stored in the smart engine itself, or stored in a flash memory, a SRAM, a DRAM, or a NVRAM on the application processor, or any memory space, or accessed from a storage out of the smart engine via an interface of SPI, I2C, I3C, and/or SLIMbus.

15. The smart engine of claim 10, wherein the basic neural network is configured to select the profiles depending on preliminary results provided by the preliminary analysis of the basic neural network, a current state, a previous state, time information, and/or location information.

16. The smart engine of claim 10, wherein the picker is configured to select the images depending on preliminary results provided by the preliminary analysis of the basic neural network, a determination of the blur detector, a current state, a previous state, time information, and/or location information.

17. A method of operating a smart engine communicating with an application/host processor and a plurality of sensors, the method comprising:

step S1: using the application/host processor to set the smart engine;

step S2: using the smart engine to set the sensors, the sensors being configured to generate sensor data;

step S3: using the smart engine to extract features, objects, or scenes from the sensor data; and step S4: using the smart engine to derive metadata after processing the extracted features, objects, or scenes;

wherein the smart engine includes:

a buffer configured to store the sensor data from the sensors;

a preliminary processing module connected to the sensors and/or the buffer, the preliminary processing module being configured to perform a preliminary analysis based on the sensor data; the preliminary processing module being an automatic selector;

a profile collector connected to the preliminary processing module, the profile collector being configured to store a plurality of profiles, one or more suitable profiles being dynamically selected according to an instruction from a user or the automatic selector;

a picker connected to the buffer and the preliminary processing module, the picker being configured to select one or more suitable sensor data from the buffer; and a main processing module connected to the profile collector and the picker, the main processing module being configured to receive the suitable sensor data from the picker and perform a detailed analysis to determine detailed properties of features, objects, or scenes based on suitable sensor data.

18. The method of operating the smart engine of claim 17, further comprising step S5, the step S5 is using the smart engine to notify the application/host processor when the smart engine determines that the extracted features, objects, or scenes satisfy a specified condition.

* * * * *